Sept. 27, 1955 J. B. ULAM 2,718,690
METHOD OF PRODUCING COMPOSITE METALS
Filed May 20, 1950
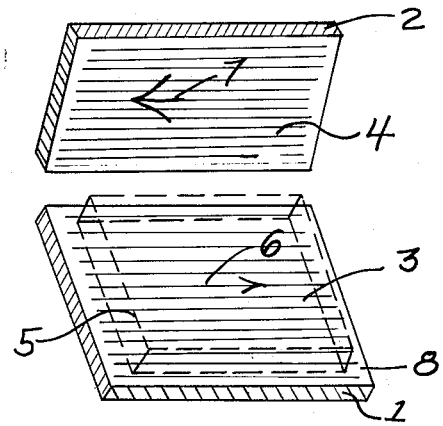
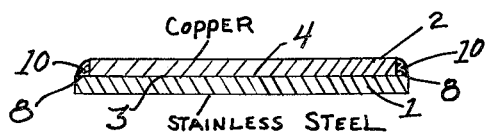
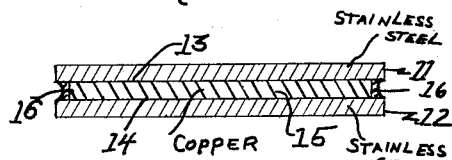
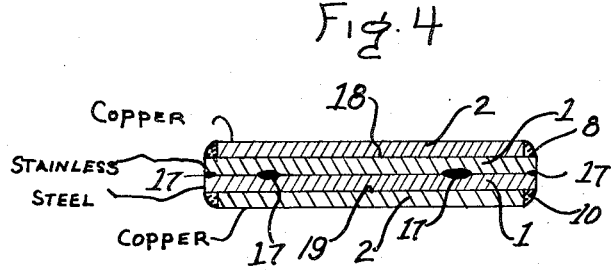
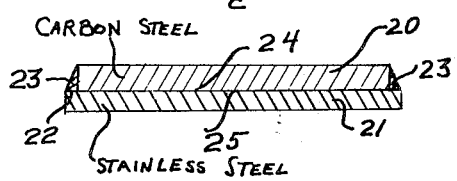
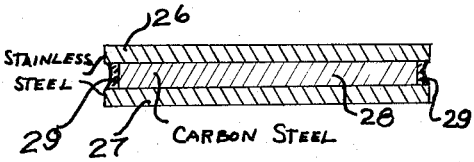
INVENTOR.
JOHN B. ULAM
BY
*William D. Carothers*
HIS ATTORNEY United States Patent Office 2,718,690
Patented Sept. 27, 1955

2,718,690

METHOD OF PRODUCING COMPOSITE METALS

John B. Ulam, Bethel Township, Allegheny County, Pa.

Application May 20, 1950, Serial No. 163,318

2 Claims. (Cl. 29—471.5)

This invention relates to the method of producing composite metals and more particularly to the method of producing a clad metal capable of being hot and cold worked and deep drawn in the manufacture of articles.

The principal object of this invention is to provide an improved method of unifying dissimilar metals to form an integral structure that can be subsequently worked by rolling, hammering, forging, drawing, pressing and deep drawing without danger of separating the several lamina of the dissimilar metals from one another.

This invention is an improvement over that disclosed in Patents 1,392416 of October 4, 1921, and 2,468,206 of April 26, 1949.

The method comprising this invention may be advantageously utilized in making clad composite metal such as copper, wherein the copper is clad on stainless steel or mild steel, or wherein the copper clad is on both sides of a selected steel, or interposed between selected steels. This method also contemplates an improved process for forming composite metals of ferrous or nonferrous metals such as stainless steel, mild steel, or other combinations of steel, or its alloys with other metals.

The method comprising this invention does not employ any type of flux, bonding material or electrolytic bonding agent but utilizes the actual molecular structure of each of the metals being combined to form a multimetallic composite.

The method comprising this invention may be employed for making up composite ingots, blooms or plates which may be heated to the proper temperature to permit the adjacent surfaces of the different metals to be diffused into one another after which the article may be hot worked by pressing, forging or rolling. After the composite structure has been worked it should be annealed to relieve the stress and then it may again be hot or cold worked. After each working it should be re-annealed.

The method of producing the composite metal as disclosed in this application provides a material improvement in the joint between the diffused dissimilar metals.

The principal improvement comprising the method of this invention is the unidirectional removal of the surface of the adjacent metal components to provide newly exposed and directionally cleaned surfaces. The newly exposed and directionally cleaned surfaces of the different metal components are then placed in direct aligned contact with each other to provide the composite structural body. Since each of these contacting surfaces have been unidirectionally cleaned, the molecules in the surfaces have been mechanically arranged in parallel lines and the molecules of the different metals are permitted to interlock when heated and subjected to pressure in successive steps in the absence of air or other oxidizing agents. If the unidirectionally cleaned surfaces were placed so that the lineal direction of molecules of one surface lies transversely to that of the other surface, the molecules of the respective surfaces are not permitted to properly interlock with one another and, therefore, will not properly diffuse together and form a good joint therebetween.

It has been recognized in the aforementioned patents that the surface of the metals should be cleaned or milled before being clamped together and subjected to heat and pressure. Such a teaching is insufficient to produce a proper joint between dissimilar metals and it has been determined that the surface of the metals must be removed in a unidirectional manner by grinding or milling, and these unidirectional cleaned surfaces must then be placed together with the lines of the direction of cleaning both surfaces lying parallel with one another. Without this requirement a poor joint will be made. The unidirectional cleaned surfaces may be opposed to each other so long as they are parallel.

Another important feature of this invention is the method of sealing the perimeter of the component parts from the air or other oxidizing medium. Such sealing would be unnecessary if the initial pressure were applied to the heated composite in an atmosphere free of any oxidizing agents. In view of the fact that most of the composite metal is not worked in a reducing atmosphere but in the open air, it is necessary and desirable to seal the juncture of the unidirectionally cleaned surfaces as they lie flat against one another. This sealing may be accomplished by welding the surfaces adjacent the juncture of the metal parts and around the complete perimeter of these component parts.

If the composite body is made with stainless steel on both sides of a piece of copper, it is preferable to seal the perimeter of both joints by welding. The flat surfaces of the stainless steel, which should be marginal and project beyond the edge of the copper, are welded adjacent the juncture of the joint. The welding should preferably extend from the marginal surface of one stainless steel member to the marginal surface of the other, thus completely enclosing the copper.

If stainless steel were placed on both sides of mild steel the inner lamina of mild steel should be sealed in the same manner by welding completely around and over the surface of the mild steel. By sealing the entire surface of the inner lamina in this manner, the soft laminated section is prevented from being extruded when subjected to the proper temperature and rolling pressure.

Another feature of this invention is the provision of a method of forming a plurality of composite bodies by unidirectionally cleaning the surfaces of dissimilar metals to be mated in aligned contact and sealing around the juncture of the joint by welding across the perimetral edge and covering the adjacent perimetral surfaces of dissimilar metals and then tack welding the similar metals placed back to back to retain them as a unitary structure, but permitting their adjacent surfaces to become oxidized and thus maintain the composite bodies separated from one another. By tack welding like metals back to back, such as stainless steel, with the clad surface forming the outer component of each of the composite metal structures, the air may penetrate between the abutting surfaces of the similar or stainless steel components and prevents them becoming integral with one another. However, the two composite bodies remain as a unitary structure until each has been worked, heat treated, and formed into the desirable shape and thickness. When completed they may readily be separated and used independently by cutting away that part which was tack welded.

Other objects and advantages appear hereinafter in the following description and claims.

The accompanying drawings show, for the purpose of exemplification, without limiting the invention or claims thereto, certain practical embodiments of the invention wherein:

Fig. 1 is a view illustrating two composite members the adjacent surfaces of which have been unidirectionally cleaned and are about to be placed together.

Fig. 2 is a sectional view illustrating a composite body constructed of copper and stainless steel.

Fig. 3 is a cross sectional view showing a composite body having three laminae, the outer lamina being stainless steel and the intermediate lamina being copper.

Fig. 4 is a cross sectional view showing two composite bodies, each made up of a copper and a stainless steel lamina, the stainless lamina of each body being back to back and tacked together.

Fig. 5 is a sectional view showing a composite body form of a lamina of mild steel and stainless steel.

Fig. 6 is a cross sectional view showing a composite body constructed of three laminae, the outer lamina being stainless steel and the intermediate lamina being mild steel.

Referring particularly to Figs. 1 and 2 of the drawings, the lamina 1 represents a block or sheet of metal which is to be joined with the block or sheet 2 of a different metal. Of course the metals could be the same. However, the principal features of inventions of this charter are ordinarily directed to the composite arrangement of dissimilar metals.

Each of the metals 1 and 2 are surface-cleaned as indicated at 3 and 4, respectively. The surface 3 has been cleaned unidirectionally, in the direction of the arrow 6 and the surface of 4 has been cleaned unidirectionally, in the direction of the arrow 7 as indicated. The body of the metal 2 may be placed on the body of the metal 1, as indicated by the dotted lines 5 with the unidirectionally cleaned surfaces being in either opposite parallel alignment, as illustrated by the arrows, or in parallel alignment in the same direction, whichever is desired and which is defined in the claims as "directional aligned contact." The arrows, as indicated at 6 and 7, should be parallel to one another regardless of whether they are going in the same or opposite direction. However, they should never be transverse or otherwise disposed angularly to one another as these surfaces will not provide the proper interlocking between the aligned molecules obtained by the unidirectional cleaning.

To unidirectionally clean the surfaces of the components, it is preferable that they be ground in one direction. The grinding may take place over the whole surface at the same time, or it may be produced by a grinding wheel or other grinding tool which traverses the surface and removes the same in one direction only. The surface may be milled as well as ground, or it may be unidirectionally cleaned by other methods such as by grit blasting so long as the cleaning process does not leave any grit, oxide or foreign matter. However, it is believed necessary to remove a portion of the surface in order to insure that all of the oxides, pits and scales are removed so as to insure a good joint between the metals.

In making up composites of dissimilar metals it is preferable to provide a one-half inch margin, such as illustrated at 8 in Fig. 1, between the softer metal which would be indicated at 2 and the harder metal, as indicated at 1. This one-half inch marginal flange around the perimeter of the metal provides a continuous surface adjacent the juncture of the joint and upon which the added metal weld should be made. This margin provides a sufficient base for extending the added metal weld up the sides of the smaller component to completely cover the edge of the same, as illustrated in Fig. 2 at 10. It will be noted that the welding substantially covers a goodly portion of margin 8 and extends to the top of the copper member 2, whereas the bottom member indicated at 1 is stainless steel. The weld 10 extends around the perimeter of the composite body and completely seals the surfaces 3 and 4 from the air. The unidirectional cleaning by removing a portion of the metal from the surfaces permits these surfaces to become firmly interlocked and they will readily adhere to one another. Since weld 10 extends up over the copper, the copper does not have the tendency to extrude outwardly and project beyond the dimensions of the stainless steel sheet 1 when subjected to pressure or rolled.

As shown in Fig. 3, the stainless steel members 11 and 12 have had their opposite surfaces 13 and 14 cleaned by unidirectionally grinding the same and both sides of copper member 14 have likewise been ground in a unidirectional manner to match the unidirectional cleaning of the other two surfaces. When the members 11 and 12 are placed together with the copper member 13 therebetween, the perimeter edge is welded, as indicated at 16, to completely enclose the copper and the engaging surfaces. Here again the copper is unable to be extruded when the composite is rolled at high temperatures, as it is retained in place by the welding and then the diffused joint is formed by the dissimilar metals upon the first application of pressure after being heated to the proper temperature.

As shown in Fig. 4 two of the composite members 18 and 19, such as shown in Fig. 2, each comprises a copper member 2 and a stainless steel member 1, which have been placed back to back. The stainless members 1 have been tack welded together as indicated by the spaced tack welds 17. The spaced tack welds 17 hold the two composite members 18 and 19 together as a unit, but owing to the fact that these members are tack welded together, the air may enter between the back to back surfaces of the stainless steel members 1 and form an oxide on these surfaces, thus preventing them from becoming permanently united. After this structure has been heated and rolled to their proper thickness, the composites may be trimmed around their edges resulting in two composite pieces in place of one for the single rolling and heating operation.

Although this invention has been disclosed with reference to copper and stainless steel, this practice may be extended to any desirable dissimilar metals.

The structure shown in Fig. 5 is similar to the structure shown in Fig. 2 only this structure illustrates a mild steel 20 being attached to a stainless steel 21. One-half inch margin is placed, as illustrated at 22, on the stainless steel which represents the hardest body, and a weld 23 extends substantially over the entire edge of the mild steel 20. The mild steel being softer and, when subjected to high temperatures, it may have a tendency to extrude and flow at a faster rate than the stainless steel when subjected to diffusing pressures. The weld 23 which extends around the entire perimeter of the composite body prevents air from entering between unidirectionally cleaned surfaces 24 and 25 that are being diffused by heating the composite body and subjecting it to pressure.

The structure of Fig. 6 is similar to that of Fig. 3 but provides for two stainless steel plates 26 and 27 on the outside of a mild steel plate 28, with the mild steel being completely enclosed and sealed by the perimetral weld 29. The joining surfaces of each of these members being unidirectionally cleaned and placed in parallel relation to each other.

When copper is employed as one of the constituents in fabricating the composite body comprising this invention, it is preferable to heat the body to a temperature from 1675° F. to 1800° F., and while the body is at this temperature it is subjected to a pressure applied normally to the engaging surfaces. This pressure may be applied by pressing, by hammering, or by rolling, or any other suitable manner. Regardless of the method employed to apply the pressure and thus to diffuse the mating surfaces into an integral structure, it may also be employed to reduce or reshape the composite metal once the joint is made between the composite metal parts. The heated body may be further rolled or otherwise subjected to hot working until it cools to below 1100° F. After the hot working the copper composite metal should be annealed at 1650° F. for nine minutes to completely remove the stress from the composite metal. If the copper composite cools too rapidly while hot working, it may be repeatedly reheated to hot working temperatures for the purpose of continuing the hot working.

If, however, it is desirable to hot and cold work the copper composite body, it is preferable to heat the same to within 1675° F. to 1800° F. and form the diffused juncture between coacting surfaces, and then hot work the same to obtain a partial reduction such as by rolling. The composite body should again be heated at a temperature of 1650° F. for a period of three minutes and allowed to cool after which time it may be cold rolled. The copper composite metal should be again annealed at 1650° F. for a period of nine minutes after cold working. If a copper composite is to be rolled and requires a considerable reduction, it may be partially reduced during hot working period to a point 15% to 20% above the desired finished gauge and further reduced to finished gauge by cold working. If repeated and alternate operations of hot and cold working are to be employed, there must be an intervening and final step of annealing at the temperature limits mentioned above.

A similar program may be employed for forming and reducing the other metals such as mild steel and stainless steel. These steels may be heated from 1950° F. to 2100° F. for a period of from five minutes to sixty minutes depending upon the character, weight and gauge of the steel. After hot working, the composite may be annealed at a temperature of 1950° F. to 2100° F. for a period of from five to sixty minutes. After cold working, the composite should be again annealed to a temperature of 1950° F. to 2100° F. for a period of from five minutes to sixty minutes depending upon the character size and weight of metal. Thus here again, by the use of unidirectionally cleaning surfaces of the composite metal, one can hot and cold work the same by having an intervening annealing stage.

The composite metals, and particularly those of copper, stainless steel and mild steel in any of the forms, as illustrated in the drawings, may be deep drawn without breaking the union between dissimilar metals that have been joined together by diffusion and also without fear of the rupture of the outer surfaces which is a vast improvement over any of the bonding types of composite bodies as disclosed in prior art.

Copper clad or copper core composites made by this process is capable of being deep drawn to a greater degree than composites made by those processes disclosed in the prior art and still retain a lustrous finish as well as or superior to the solid metal, such as stainless steel of the same gauge and drawn to the same degree. This process completely eliminates the characteristic of orange-peeling or pebbling after deep drawing or cold working, which is common with copper clad and copper core composites made by processes disclosed in the prior art.

By fabricating a composite metal structure of this character one is enabled to build or otherwise form a structure that can withstand terrific heat owing to its ability to dissipate the heat throughout the entire body in the shortest possible period of time, particularly when the heat to be dissipated is of an intermittent nature. Such improved physical characteristic is believed to be due to the novel union between the dissimilar metals as formed by unidirectional cleaning and then the interlocking of their parallel molecules by diffusion.

Clad metal manufactured in accordance with the teachings of this invention provides a yield of usable material of from 85% to 95% of the original composite metal stock whereas clad metal now being manufactured under known processes, such as the fusion or casting method, the use of an electrolytic bonding agent, by the use of flux, or by interposing a thin metallic bonding sheet, will provide a yield of from 45% to 70% of the original composite metal stock. This represents a material advancement in the art.

I claim:

1. The method of making a composite body from a plurality of metal components comprising unidirectionally mechanically removing the attaching surfaces of each of the metal components to provide newly exposed and directionally cleaned molecular surfaces, stacking the components with the newly exposed and directionally cleaned molecular surfaces of the different metal components in directionally aligned contact with each other to interlock their molecular structure and to form a stacked composite body, enclosing the cleaned surfaces of the stacked components to be joined to completely seal the directionally cleaned surfaces from the atmosphere and hold them in contact with one another to form an assembly, heating the assembly to a predetermined temperature to dilate the molecular structure of the composite parts, and subjecting the heated assembly to working pressure to diffuse the directionally cleaned contacting surfaces together and to form an integral body.

2. The method of making a composite body from a plurality of metal components comprising unidirectionally mechanically removing the attaching surfaces of each of the metal components to provide newly exposed directionally cleaned molecular surfaces, stacking the components with the newly exposed and directionally cleaned molecular surfaces of the different metal components in directionally aligned contact with each other to interlock their molecular structure and to form an assembly, eliminating oxidizing atmosphere from the cleaned molecular surfaces in contact with one another, heating the assembly while the elimination of the oxidizing atmosphere subsists to a predetermined temperature to dilate the molecular structure of the composite parts, and subjecting the heated assembly to working pressure while the elimination of the oxidizing atmosphere subsists to diffuse the directionally cleaned contacting surfaces together and form a composite body.

References Cited in the file of this patent

UNITED STATES PATENTS

| Number | Name | Date |
|---|---|---|
| 1,392,416 | Henderson | Oct. 4, 1921 |
| 1,956,818 | Acre | May 1, 1934 |
| 2,053,096 | McKay | Sept. 1, 1936 |
| 2,147,407 | Huston | Feb. 14, 1939 |
| 2,249,417 | Chace | July 15, 1941 |
| 2,325,659 | Chace | Aug. 3, 1943 |
| 2,414,510 | Doyle | Jan. 21, 1947 |
| 2,414,511 | Dyar | Jan. 21, 1947 |
| 2,468,206 | Keene | Apr. 26, 1949 |
| 2,473,712 | Kinney | June 21, 1949 |
| 2,558,093 | Kinney | June 26, 1951 |